2 Sheets -Sheet 1.

G. T. RIDDLE.

SAWING-MACHINE.

No. 7,303. Reissued Sept. 5, 1876.

ATTEST:

Robert Burns.

Le Blond Burdett

INVENTOR:

George T. Riddle

By Knight Bros

Attys

N. PETERS, PHOTO-LITHOGRAPHER, WASHINGTON, D. C.

2 Sheets—Sheet 2.

G. T. RIDDLE.

SAWING-MACHINE.

No. 7,303. Reissued Sept. 5, 1876.

ATTEST:

Robert Burns

Le Blond Burdett

INVENTOR:

George T. Riddle

By Knight & Bros

Attys.

N. PETERS, PHOTO-LITHOGRAPHER, WASHINGTON, D. C.

UNITED STATES PATENT OFFICE.

GEORGE T. RIDDLE, OF ST. LOUIS, MISSOURI.

IMPROVEMENT IN SAWING-MACHINES.

Specification forming part of Letters Patent No. 143,033, dated September 23, 1873; reissue No. 7,303, dated September 5, 1876; application filed May 26, 1876.

*To all whom it may concern:*

Be it known that I, GEORGE T. RIDDLE, of the city and county of St. Louis and State of Missouri, have invented a certain new and useful Improvement in Sawing-Machines, of which the following is a full, clear, and exact description, reference being had to the accompanying drawings, making a part of this specification.

My invention consists in the supporting of a circular saw or saws on a mandrel or mandrels having journal-bearing in a frame supported on a central shaft, so that the saw-mandrel is at a distance from the central shaft, and the continuous rotation of the shaft will carry the saw to and through the stuff being operated on, and which stuff may remain at rest while being sawed. The saw or saws have also continuous rotation on their axes in addition to their continuous revolution with their supporting-frame.

Figure 1:
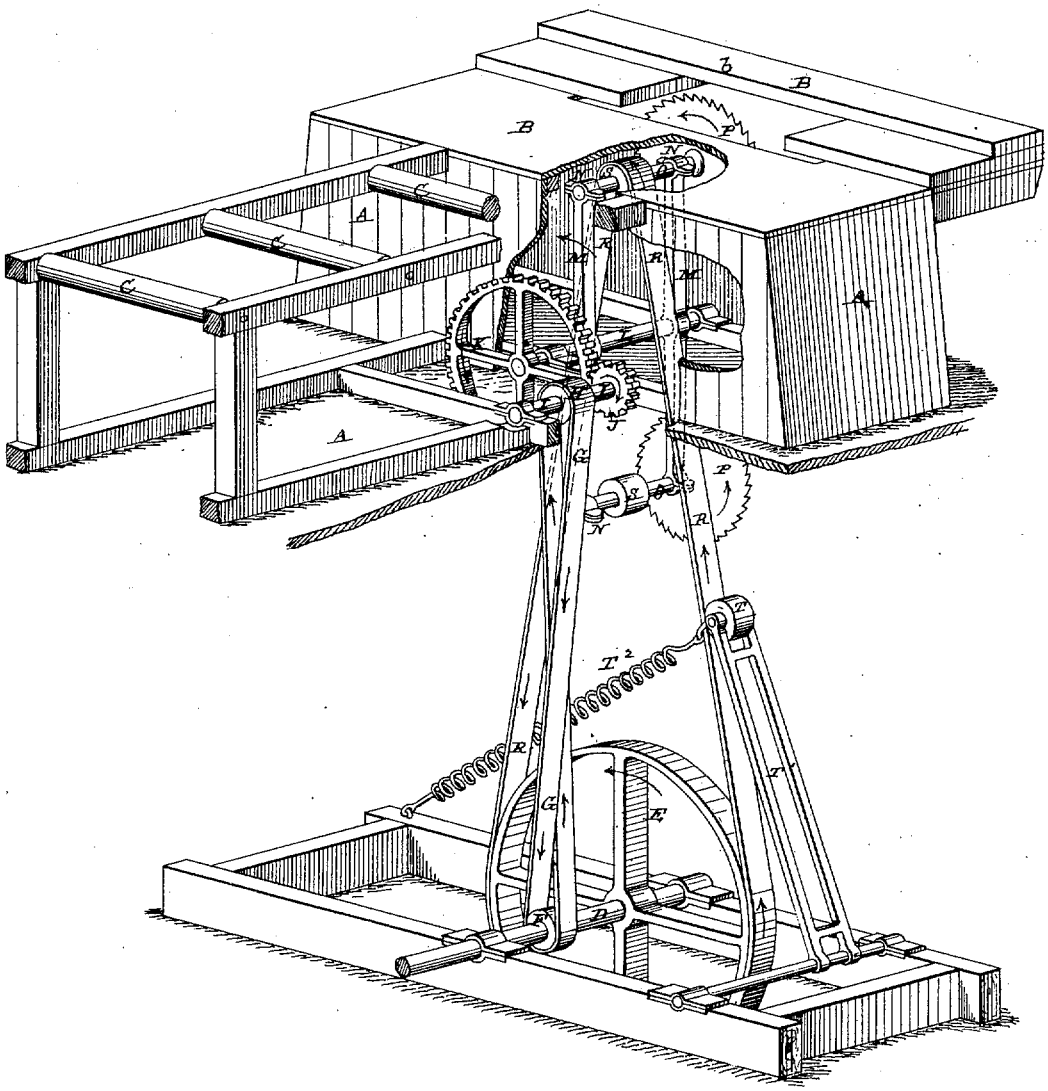
Figure 2:
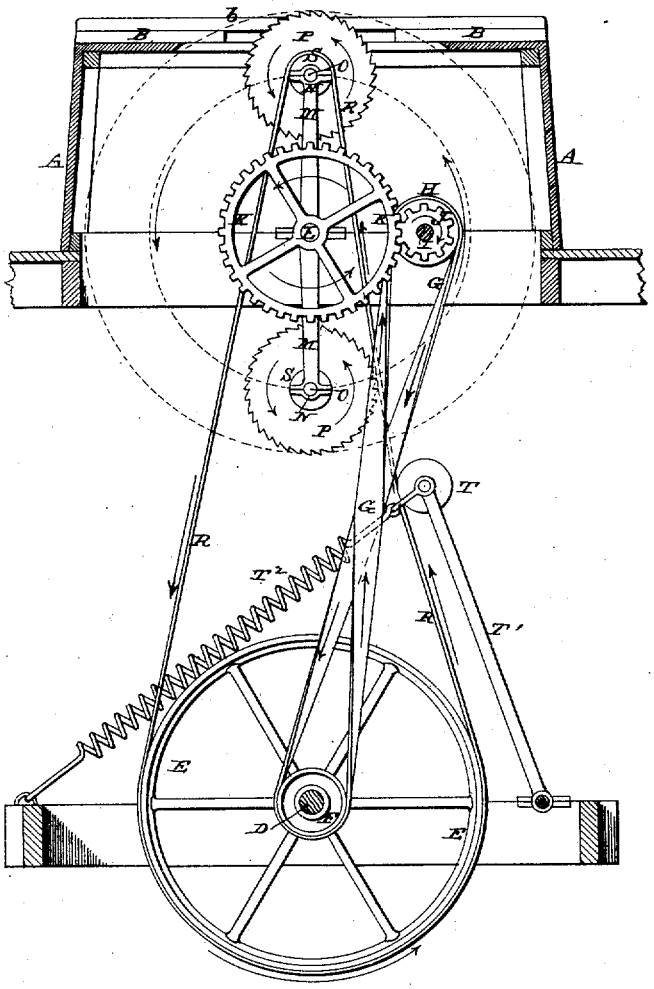

Figure 1 is a perspective view of a machine illustrative of my invention. Fig. 2 is a diagram illustrating the motion of parts.

A is the frame, which may be of any suitable construction. B is the table. C C are rollers supporting the stuff which is being sawed. D is a shaft, carrying a larger pulley, E, and a smaller pulley, F. The smaller pulley F has a belt, G, passing over a pulley, H, on a shaft, I, which carries a spur-wheel, J, and said wheel J engages a larger spur-wheel, K, on a shaft, L, which carries a frame or cross-arms, M M, having at the outside journal-boxes N N, for the mandrels or spindles O of the circular saws P P. The saws receive rotation from a belt, R, passing around the pulleys S S, and also extending around the large pulley E on the shaft D.

The shaft D may be turned by belt or cog-gearing, or by any other means desired.

An "idler" pulley, T, is applied to the belt R, to prevent any slackness occurring from change of position in the pulleys S S on the saw-mandrels, consequent on their revolution around the axis L. The saws are made to revolve around and with the shaft L by the belt G, through the means of the pulley H, shaft I, and spur-wheels J K. The idler is supported on a hinged frame, $T^1$, and is held against the belt by the weight of the pulley and frame and a spring, $T^2$, whose ends are connected, respectively, to the free end of frame $T^1$ and to the frame of the counter-shaft D.

The spring is not indispensable, as the idler may act by gravity alone. This idler prevents the belt R from becoming slack from the change in position of the pulleys S S, and from running off the pulleys from this cause, and from the check given to the saws by contact with the stuff.

The stuff to be sawed (say, a long plank to be cut in lengths) is laid upon the rollers C and table B, and its end pushed against the stop-guide *b* when neither of the saws is above the table. The revolution of the saws as they are carried forward in their circuit by the rotation of the central shaft L brings one of them, or a part of one of them, above the table, and carries it forward through the plank. The cut block is then removed from the table, and before the saw again rises above the table the plank is pushed forward to the stop *b*, in order that another block may then be cut off.

In constructing my machine for some uses, I propose to place the shaft L on about the same level as the stuff to be sawed, and in this case the saws would pass downward through the stuff, the plank being placed upon its edge, the edge resting steadily on the rollers C and table B from end to end, and thus insuring the transverse cut made by the saws being at right angles to the edge of the plank.

I do not claim, broadly, the arrangement of circular saws at opposite ends of arms attached centrally to a horizontal shaft, as I am aware that such arrangement is not new; nor do I claim, broadly, such an arrangement of saws when the same are mounted, so that either one of a pair of saws may be brought to the same position for optional use.

I am not aware of any example previous to my invention of a circular saw or saws mounted at the extremities of arms carried by a continuously-rotating shaft, so that by the continuous rotation of the said shaft the said saw or saws will be caused to act intermittently, and, if more than one be used, successively.

I claim—

1. One or more circular saws, P, supported with their driving arbor or arbors O at a distance from a central shaft, L, rotating continuously to bring the saw or saws to their work, substantially as set forth.

2. In combination with the saw-driving pulleys S S and belt R, the idler T, insuring the constant rotation of the pulleys and retention on said pulleys of the belt in all positions of the frame M M, substantially as set forth.

GEORGE T. RIDDLE.

Witnesses:

SAML. KNIGHT,

ROBERT BURNS.